US00RE34105E

United States Patent [19]

Flotow et al.

[11] E Patent Number: Re. 34,105

[45] Reissued Date of Patent: Oct. 20, 1992

[54] INTERNAL ASSISTED CLUTCH

[75] Inventors: Richard A. Flotow, Butler; Thomas G. Dickson, Ft. Wayne, both of Ind.

[73] Assignee: Dana Corporation, Toledo, Ohio

[21] Appl. No.: 559,686

[22] Filed: Jul. 30, 1990

Related U.S. Patent Documents

Reissue of:

[64] Patent No.: 4,760,906
Issued: Aug. 2, 1988
Appl. No.: 48,250
Filed: May 11, 1987

[51] Int. Cl.[5] ..... F16D 13/44; F16D 13/75; F16D 23/14

[52] U.S. Cl. ..... 192/70.25; 192/70.27; 192/70.28; 192/70.3; 192/89 R; 192/111 B

[58] Field of Search ..... 192/70.28, 70.25, 70.29, 192/70.3, 7.22, 89 R, 99 A, 111 B, 101, 89 QT, 70.27, 98

[56] References Cited

U.S. PATENT DOCUMENTS

| | | | |
|---|---|---|---|
| 1,791,016 | 2/1931 | Sundh | 192/111 B X |
| 2,067,970 | 1/1937 | Laszlo | 192/89 R X |
| 2,400,586 | 5/1946 | Zimmermann | 192/105 A |
| 2,562,613 | 7/1951 | Halberg | 192/99 A X |
| 2,765,892 | 10/1956 | Reed | 192/99 A |
| 3,162,286 | 12/1964 | Smith et al. | 192/89 R |
| 3,276,555 | 10/1966 | Phelps et al. | 192/89 R X |
| 3,394,788 | 7/1968 | Sink | 192/99 A X |
| 3,667,582 | 6/1972 | Borck et al. | 192/99 A |
| 3,752,286 | 8/1973 | Sink | 192/111 A |
| 4,034,836 | 7/1977 | Sink et al. | 192/99 A |
| 4,157,749 | 6/1979 | Sink et al. | 192/99 A |
| 4,285,424 | 8/1981 | Sink et al. | 192/111 B |

FOREIGN PATENT DOCUMENTS 802977 2/1951 Fed. Rep. of Germany .

*Primary Examiner*—Rodney H. Bonck
*Attorney, Agent, or Firm*—MacMillan, Sobanski & Todd

[57] ABSTRACT

A clutch cover assembly including a clutch cover and pressure plate axially movable relative thereto and unitarily rotatable therewith. A release collar within the cover actuates a plurality of levers which move the pressure plate toward and away from its engaged position. A plurality of engagement springs act between the cover and the collar to spring load the clutch. Three assister springs are disposed equidistantly about the collar and engage the latter and an inwardly facing surface carried by the cover. When the pressure plate is in its engaged position, the assister springs are disposed perpendicular to the clutch axis. When the collar is moved toward the clutch disengaged position, the assister springs are tilted away from their engaged position and begin to generate a force axially in the direction of movement of the release collar and assist in the axial movement thereof.

61 Claims, 3 Drawing Sheets

INTERNAL ASSISTED CLUTCH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to clutches in general and more particularly to a clutch having an internal assist to help move the clutch to a disengaged position.

2. Background of the Invention

There are many examples of prior art assist devices, but the great majority of them have an assist device which is located outside of the clutch cover. Additionally, truck clutches take a lot of effort to disengage and previously known assist devices are complex, expensive, subject to breakdown because of excessive parts, and are positioned externally of the clutch where they are subject to damage from the elements.

SUMMARY OF THE INVENTION

The present invention relates to an improvement in spring loaded clutches wherein an assisting force internally of the clutch cover assembly is generated when the clutch release mechanism is activated. More particularly, in a preferred embodiment, three springs are disposed circumferentially equidistant about the clutch release collar. The release collar is provided with radially outwardly extending ramped surfaces against which the radially inner end of the assister springs engage and react. The radially outer ends of the assister springs are received on similar radially inwardly extending ramped surfaces formed in the clutch cover. When the clutch is in the engaged position the compressed assister springs are each disposed with its axis positioned radially with respect to the axis of the release collar and therefore do not urge the release collar axially, but rather their forces are directed radially only. However, when the release collar is moved axially relative to the clutch cover, such as would occur when the clutch is being disengaged, the assistor springs are tilted away from their radial position, such that a component of their force urges the collar in the direction of its movement, assisting the collar in overcoming the load of the clutch engaging springs.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF A PREFERRED EMBODIMENT

Figure 1:
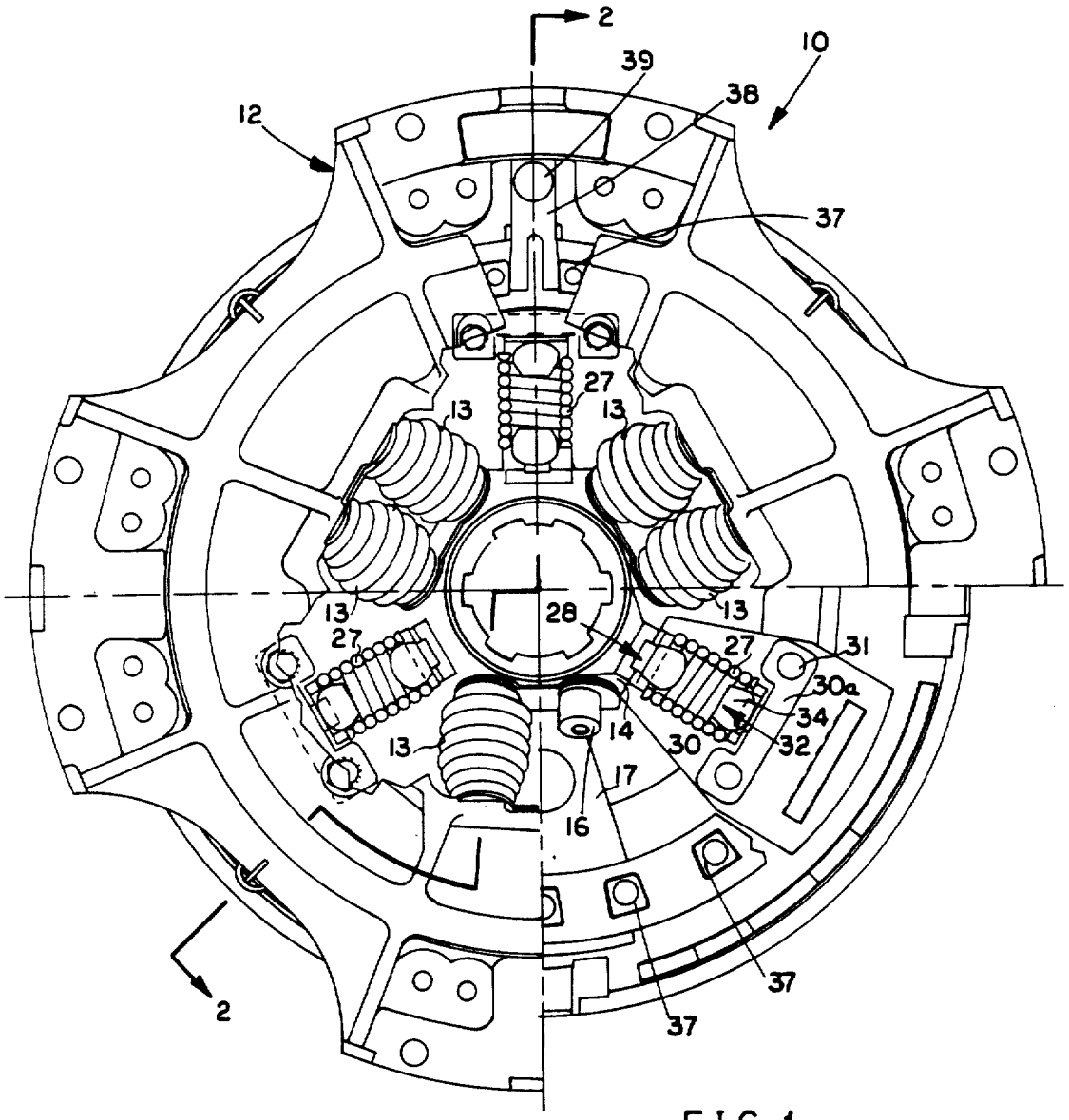
FIG. 1 is [a] *an* elevational view looking from the throw-out bearing end of a clutch cover assembly embodying this invention, with the throw-out bearing and other portions being omitted for added clarity and with portions of the clutch cover being broken away to reveal the relationship of internal components of the clutch.
Figure 2:
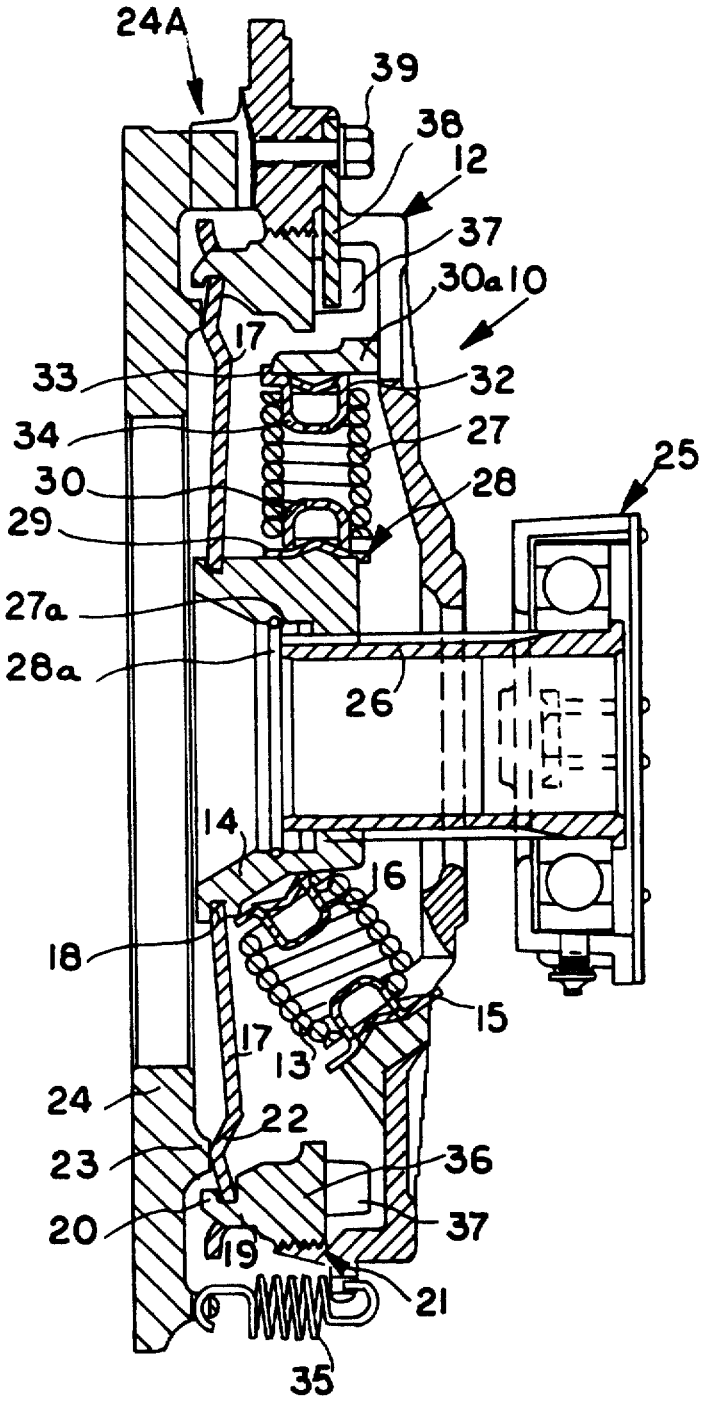
FIG. 2 is a sectional view taken substantially along the lines 2—2 in FIG. 1 showing the clutch cover assembly with the pressure plate and the other components in the clutch engaged position.

Referring to FIGS. 1 and 2, the clutch cover assembly 10[,] includes a clutch cover 12 which is conventionally adapted to be secured to a flywheel (not shown) for unitary rotation. The conventional driven discs of the clutch 10 are also not shown for added clarity. Six coiled compression springs 13 (one of which being omitted in FIG. 1 for clarity) in three pairs of two springs each are [comprssed] *compressed* between the cover 12 and a tilted ramp on a release collar 14. These springs 13 and their cooperation with the release collar 14 are covered in detail in the description regarding FIGS. 1-5 of U.S. Pat. No. 3,394,788, which patent is assigned to the assignee of the present invention, and *the* detailed description of the structure and operation thereof is incorporated by reference. Suffice it to say that the radially outer end of each spring 13 is piloted on a button 15 which is slanted such that its axis extends radially inwardly and forwardly toward a substantially coaxial button 16 carried by the release collar 14 on the external [perphery] *periphery* thereof. The buttons 15 and 16 pilot the opposed ends of the springs 13. The springs 13 urge the collar 14 to the left, or engaged position. A plurality of clutch levers 17 engage, at their inner end, in a peripheral groove 18 formed in the collar 14, while the outer end of each lever has an opening 19 which receives a leftwardly projecting pivot 20 formed on the left face of an adjusting ring; which ring is threaded into the clutch cover 12 as shown at 21. Intermediate the ends of each lever 17, but closer to its outer end, is a leftwardly extending projection 22 which pivotally and pressingly engages an annular shoulder 23 formed on the right side of a pressure plate 24. Thus leftward movement of the release collar 14 causes the levers 17 to force the pressure plate 24 to its engaged position as seen in FIG. 2. As explained in said U.S. Pat. No. 3,394,788, movement to the left causes a greater component of force of springs 13 to be imposed upon the pressure plate 24, while movement to the right of the collar 14, caused by movement toward disengagement of a throw-out bearing 25 carried by a sleeve 26, which sleeve *26* in turn is secured to the release collar *14* by a pair of snap rings 27a and 28a, causes the axis of the springs 13 to become more radially disposed, which reduces the component of force of the springs 13 which the release bearing 25 must overcome.

The pressure plate 24 is connected to the cover 12 for unitary rotation and relative axial movement by a plurality of spaced lug and slot arrangements 24a formed conventionally on the pressure plate and cover, respectively.

Means are provided to assist the release collar 14 in being moved toward the disengaged position by throw-out bearing 25. More particularly, three assister springs 27[,] are equally displaced circumferentially about the collar 14 with one assist spring *27* being disposed between each pair of adjacent engagement springs 13. As seen in FIGS. 1 and 2, the assister springs *27* are coiled and compressed, with their [axis] *axes* disposed radially with respect to the clutch cover 12 and collar 14 when the clutch 10 is in the engaged position.

A button *or other spring seat* 28 carried by the [pheriphery] *periphery* of the collar 14 adjacent the right end thereof has a ramped base 29 which has a hat shaped projection 30 extending radially outwardly and into the center of the adjacent coil spring 27 to pilot the inner end of the latter. A leftwardly extending bracket 30a is secured to the cover 12, as by bolts 31, and a portion of the bracket 30a overlies the spring 27. The bracket 30a has a button *or other spring seat* 32 carried on the internal surface of the bracket 30a, adjacent the left end thereof. The button 32 has a ramped base 33 from which projects radially inwardly a hat shaped projection 34 extending radially inwardly and into the center of the adjacent coil spring 27 to pilot the outer end of the latter. When positioned radially as shown in FIGS. 1 and 2, all the forces of the coiled compression springs 27 are directed radially and no component imposes an axial urging force on the collar 14.

Figure 3:
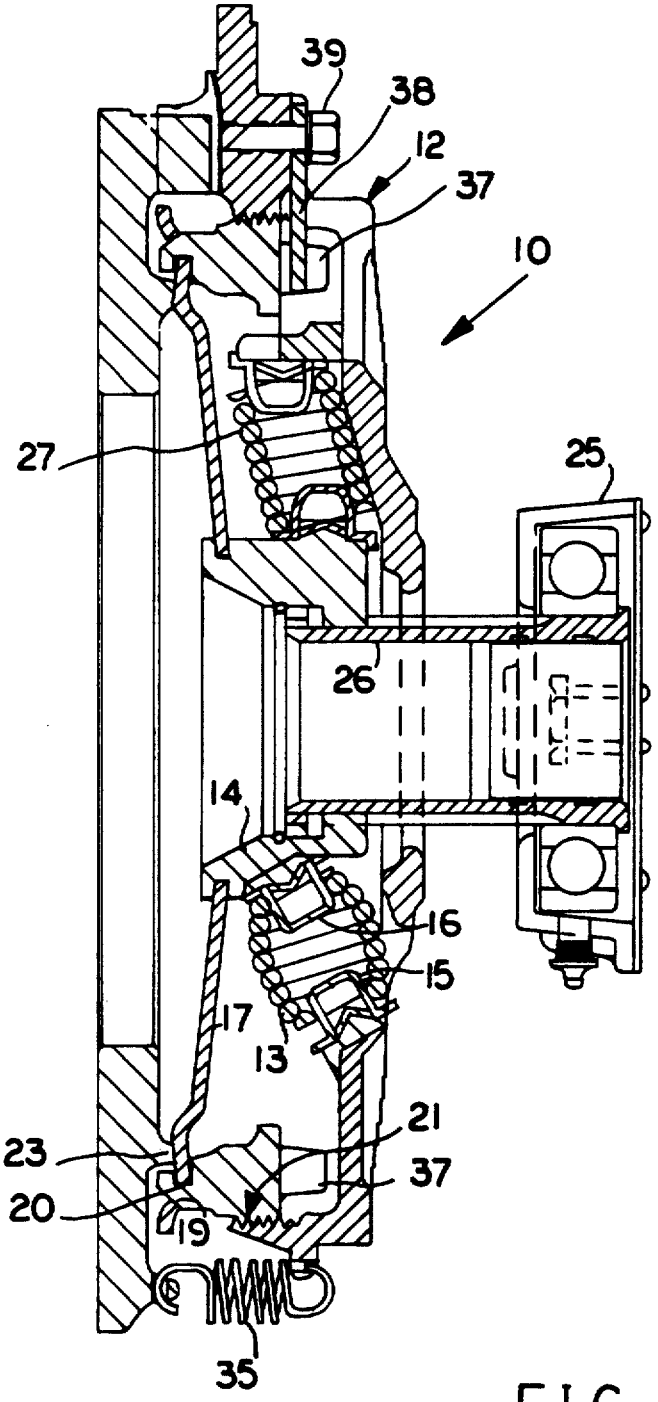
FIG. 3 is a view taken similarly to FIG. 2 with the components in the clutch disengaged position.

Movement of the throw-out bearing 25 toward its disengaged position shown in FIG. 3 results in the following action. The release collar 14 compresses the springs 13 and tilts them toward a radial position (as shown in FIG. 3)][the] . *The* inner ends of the clutch levers 17 move to the right, thereby removing the engaging load from the pressure plate 24 and allowing return springs 35 to move the plate 24 to the right. Simultaneously with the commencement of the rightward movement of the collar 14, button 28 moves to the right, thereby tilting the axis of the assister springs 27 so that the axis is inclined toward the right[and a] . *A* component of the forces of the assister springs [27] *27* is now able to impose an assisting force upon the rightward movement of the collar 14 and the throw-out bearing 25, thereby reducing the effort needed to be expended by the operator of the clutch 10 in moving it to its disengaged position of FIG. 3.

Release of the throw-out bearing 25 by the operator will allow the engaging springs 13 to re-engage the clutch, there being six springs 13 and only three assister springs 27. The design must be such that the assister springs always impose a smaller load on the clutch [then] *than* the engagement springs 13.

It is also desirable that the clutch be adjustable either manually or automatically to adjust the position of the release collar upon wear of the clutch, for if the clutch is not adjustable it will have a very limited life. As the clutch wears, there is a tendency for the pressure plate 24 to move further to the left, which would result in the condition that when the clutch is engaged, the collar 14 will be positioned to the left of the position shown in FIG. 2 and the axis of the assister springs 27 would no longer be radially straight but would be canted with their inner ends being displaced to the left. This condition would result in a component of force of the springs 27 urging the collar to the left when in the engaged position, which component would have to be overcome by the operator to cause clutch disengagement. Also, assister springs 27 would not render as much assistance to the operator when starting from such a canted position.

To this end, the manually adjustable ring 36 which is threaded in the cover 12 at 21 may be rotated so that the pilot 20 moves to the left. This will rotate all the clutch levers about their fulcrum at shoulder 23 so that their inner ends in [grove] *groove* 18 will move to the right and thereby move the release collar to the right. The right 36 has a plurality of rightwardly projecting lugs 37, as seen in FIGS. 2 and 3, which lugs are circumferentially spaced, as seen in FIG. 1. A lock pin 38 is secured between a pair of adjacent lugs 37 by a bolt 39 threaded in the cover 12, to securely position the adjusting ring 36. The bolt 39 and lock pin 38 may be removed to allow adjustment of the adjusting ring.

Examples of various configurations of clutch angularly disposed engaging springs are shown in U.S. Pat. No. 3,394,788 which is incorporated herein by reference as to those devices shown therein which can be used with a clutch cover and release collar; said Patent and the present invention being assigned to the assignee of the present invention. However, clutch engaging springs which are disposed axially are contemplated as being workable with the assister springs of the present invention.

When the pressure plate is in the engaged position as shown in FIGS. 1 and 2, the coils of the assister springs 27 are nea·ly closed, the average spacing between each coil being about eight thousandths (0.008) of an inch. The small clearance between coils allows free axial movement of the coils when the pressure plate is disengaged. In the closed condition, the assister springs 27 form a near positive circumferential driving connection between the collar 14 and the cover 12. This driving connection allows the elimination of a supplemental driving connector between the cover and collar in most applications. For example, in U.S. Pat. No. 3,394,788, the driving lugs (reference numerals 64 and 66 in U.S. Pat. No. 3,394,788) possibly could be eliminated by use of the present invention. When the pressure plate 24 is in its disengaged position, as seen in FIG. 3, it is at a lesser distance from the cover 12 [then] *than* it is in its engaged position shown in FIG. 2.

Since numerous changes can be made within the spirit and scope of the inventive concept taught herein such as adapting the invention in a push type clutch instead of the pull type shown, it is intended that the invention not be limited to the specific embodiment shown and described but that the invention be given a scope consistent with the language of the following claims.

What is claimed is:

1. A spring loaded clutch cover assembly comprising (a) a clutch cover means, (b) a pressure plate disposed coaxially with said cover means, (c) means connecting said cover means and said pressure plate for unitary rotation and relative axial movement, (d) said pressure plate having an engaged position and a disengaged position wherein said pressure plate is spaced axially from said cover means a lesser distance *in said disengaged position* than in said engaged position, (e) release means for selectively moving said pressure plate from said engaged to said disengaged position, said release means including an axially movable release collar and lever means operatively connecting said release collar to said pressure plate, (f) first resilient means reacting between said cover means and said pressure plate for biasing said pressure plate to its engaged position, and (g) second [spring] *resilient* means connected between said release collar and said cover means and disposed with its reactive axis perpendicularly relative to the axial direction of movement of said release collar when the latter and said pressure plate are in the engaged position, (h) the reactive axis of said second [spring] *resilient* means movable to an angular relationship relative to the axial direction of movement of said collar as said collar moves toward said disengaged position.

2. An assembly according to claim 1 wherein said first resilient means is connected between said release collar and said clutch cover means.

3. An assembly according to claim 2 wherein said *release* collar is disposed within said cover means and a sleeve means is connected to said *release* collar and extends axially out of said cover means and a throw-out bearing is carried by the axially outer end of said sleeve means.

4. An assembly according to claim 2 wherein said first resilient means is always disposed with its reactive axis angularly relative to the axial direction of movement of said release collar.

5. An assembly according to claim 2 including means for adjusting the axial position of said *release* collar relative to said cover means whereby said second [spring] *resilient* means will be disposed with its reactive axis perpendicularly relative to said release collar axis when said *release* collar is in the engaged position.

6. An assembly according to claim 1 wherein said release collar is disposed within said clutch cover means and a sleeve means is connected to said *release* collar and extends axially out of said cover means and a throw-out bearing is carried by the axially outer end of said sleeve means.

7. An assembly according to claim 6 wherein said first resilient means is always disposed with its reactive axis angularly relative to the axial direction of movement of said release collar.

8. An assembly according to claim 6 including means for adjusting the axial position of said *release* collar relative to said cover means whereby said second [spring] *resilient* means will be disposed with its reactive axis perpendicularly relative to said release collar axis when said *release* collar is in the engaged position[..

9. An assembly according to claim 1 wherein the reactive axis of said first resilient means is always disposed angularly relative to the axial direction of movement of said release collar.

10. An assembly according to claim 9 including means for adjusting the axial position of said *release* collar relative to said cover means whereby said second [spring] *resilient* means will be disposed with its reactive axis perpendicularly relative to said release collar axis when said *release* collar is in the engaged position[.].

11. An assembly according to claim 1 including means for adjusting the axial position of said *release* collar relative to said cover means whereby said second [spring] *resilient* means will be disposed with its reactive axis perpendicularly relative to said release collar axis when said *release* collar is in the engaged position.

12. A spring loaded clutch cover assembly comprising (a) a clutch cover means, (b) a pressure plate disposed coaxially with said cover means, (c) means for drivingly connecting said cover means and said pressure plate for unitary rotation and relative axial movement, (d) said pressure plate having an engaged position and a disengaged position wherein it moves towards said cover means from said engaged position, (e) release means for selectively moving said pressure plate from its engaged to its disengaged position, said release means including *an* axially movable release collar and a plurality of lever means operatively connecting said *release* collar to said pressure plate, (f) first resilient spring means connected between said collar and said cover means for biasing said pressure plate to its engaged position, (g) second *resilient* spring means connected between said release collar and said cover means and disposed with its reactive axis perpendicularly relative to the axial direction of movement of said collar when the latter and said pressure plate are in the engaged position, (h) said second spring means moving to an angular relationship of its reactive axis relative to the axial direction of movement of said collar as said collar moves to its disengaged position.

13. An assembly according to claim 12 wherein said release collar is disposed within said cover means and a sleeve means is connected to said *release* collar and extends axially out of said cover means and a throw-out bearing is carried by the axially outer end of said sleeve means.

14. An assembly according to claim 13 wherein said first resilient *spring* means is always disposed with its reactive axis angularly relative to the axial direction of movement of said release collar.

15. An assembly according to claim 12 wherein said [front] *first* resilient *spring* means is always disposed with its reactive axis angularly relative to the axial direction of movement of said release collar.

16. An [Assembly] *assembly* according to claim 15 including means for adjusting the axial position of said *release* collar relative to said cover means whereby said second *resilient* spring means will be disposed with its reactive axis perpendicularly relative to said release collar axis when said *release* collar is in the engaged position.

17. An assembly according to claim 12 including means for adjusting the axial position of said *release* collar relative to said cover means whereby said second *resilient* spring means will be disposed with its reactive axis perpendicularly relative to said release collar axis when said *release* collar is in the engaged position.

18. An [Assembly] *assembly* according to claim 17 wherein said first resilient *spring* means is always disposed with its reactive axis angularly relative to the axial direction of movement of said release collar.

19. A clutch assembly comprising a cover, a pressure plate disposed coaxially with said cover, means for connecting said cover and said pressure plate for unitary rotation and relative axial movement, said pressure plate having an engaged position and a disengaged position, wherein in said disengaged position said pressure plate is disposed at a lesser axial distance from said cover than in said engaged position, an axially movable release collar for selectively moving said pressure plate from said engaged position to said disengaged position, means for biasing said pressure plate to said engaged position, and an assist spring positioned with its reactive axis substantially radially between said cover and said release collar when said pressure plate is in said engaged position, whereby said assist spring exerts an axial force between said cover and said release collar when said pressure plate is moved from said engaged position toward said disengaged position.

20. A clutch as defined in claim 19 further comprising at least one lever operatively connecting said release collar to said pressure plate.

21. A clutch as defined in claim 20 further comprising means for adjusting the axial position of said release collar relative to said cover, whereby said assist spring will be disposed with [it] *its* reactive axis substantially perpendicularly relative to said release collar axis when said release collar is in said engaged position.

22. A clutch as defined in claim 20 wherein said means for biasing said pressure plate comprises at least one pressure spring between said cover and said release collar.

23. A clutch as defined in claim 22 further comprising means for adjusting the axial position of said release collar relative to said cover, whereby said assist spring will be disposed with [it] *its* reactive axis substantially perpendicularly relative to said release collar axis when said release collar is in said engaged position.

24. A clutch as defined in claim 22 wherein said release collar is disposed within said cover.

25. A clutch as defined in claim 24 wherein said pressure spring is always disposed with its reactive axis angularly relative to the axial direction of movement of said release collar.

26. A clutch as defined in claim 25 further comprising means for adjusting the axial position of said release collar relative to said cover, whereby said assist spring will be disposed with its reactive axis substantially perpendicularly relative to said release collar axis when said release collar is in said engaged position.

27. A clutch as defined in claim 24 further comprising means for adjusting the axial position of said release collar relative to said cover, whereby said assist spring will be disposed with its reactive axis [subtantially] *substantially* perpendicularly relative to said release collar axis when said release collar is in said engaged position.

28. A clutch as defined in claim 24 further comprising a sleeve connected to said release collar, said sleeve extending axially out of said cover.

29. A clutch as defined in claim 28 further comprising means for adjusting the axial position of said release collar relative to said cover, whereby said assist spring will be disposed with its reactive axis substantially perpendicularly relative to said release collar axis when said release collar is in said engaged position.

30. A clutch as defined in claim 28 further comprising a throw-out bearing carried by the axially outer end of said sleeve.

31. A clutch as defined in claim 30 further comprising means for adjusting the axial position of said release collar relative to said cover, whereby said assist spring will be disposed with its reactive axis substantially perpendicularly relative to said release collar axis when said release collar is in said engaged position.

32. A clutch as defined in claim 19 further comprising means for adjusting the axial position of said release collar relative to said cover, whereby said assist spring will be disposed with its reactive axis substantially perpendicularly relative to said release collar axis when said release collar is in said engaged position.

33. A clutch as defined in claim 19 comprising three (3) assist springs circumferentially equally spaced about said release collar.

34. A clutch as defined in claim 19 further comprising an adjusting ring for adjusting the engaged position on said pressure plate, said adjusting ring threaded onto said cover.

35. A clutch as defined in claim 19 further comprising raised surfaces on said release collar and said cover for mounting said assist spring.

36. A clutch as defined in claim 35 further comprising buttons mounted on each of said cover raised surface and said release collar raised surface for mounting said assist spring.

37. A clutch as defined in claim 36 wherein said buttons have ramped bases to accommodate axial movement of said assist spring.

38. A clutch as defined in claim 37 wherein said assist spring is a coil spring and wherein said buttons have protuberances projecting into the ends of said assist spring.

39. A clutch as defined in claim 19 comprising one or more assist springs wherein said one or more assist springs collectively impose a smaller axial force between said cover and said release collar than said means biasing said pressure plate to said engaged position when said pressure plate is in said disengaged position.

40. A clutch as defined in claim 19 wherein said assist spring is a coil spring which is substantially closed when said pressure plate is in said engaged position, whereby said assist spring forms a near positive circumferential driving connection between said cover and said release collar.

*41. A cover assembly for a clutch comprising:*

*a cover;*

*a pressure plate;*

*means for connecting said pressure plate to said cover for rotation therewith and for axial movement relative thereto between engaged and disengaged positions relative to said cover;*

*means for selectively moving said pressure plate between said engaged and disengaged positions;*

*means connected to said cover for exerting a relatively large force to urge said pressure plate toward said engaged position; and*

*means connected to said cover for exerting a relatively small force to urge said pressure plate toward said disengaged position.*

*42. The invention defined in claim 41 wherein said means for exerting a relatively small force includes resilient means reacting between said cover and said means for selectively moving said pressure plate.*

*43. The invention defined in claim 42 wherein said resilient means includes a spring extending between said cover and said means for selectively moving said pressure plate.*

*44. The invention defined in claim 43 wherein said means for selectively moving said pressure plate includes a release collar movable between engaged and disengaged positions and means connecting said release collar to said pressure plate such that movement of said release collar between said engaged and disengaged positions causes corresponding movement of said pressure plate between said engaged and disengaged positions.*

*45. The invention defined in claim 44 wherein said cover and said release collar have respective spring seats provided thereon for supporting the ends of said spring.*

*46. The invention defined in claim 44 wherein the reactive axis of said spring is oriented generally perpendicular to the axis of movement of said pressure plate when said release collar is in said engaged position.*

*47. The invention defined in claim 41 wherein said means for exerting a relatively small force exerts said force only when said pressure plate is moved out of said engaged position.*

*48. The invention defined in claim 47 wherein said means for exerting a relatively small force includes resilient means reacting between said cover and said means for selectively moving said pressure plate.*

*49. The invention defined in claim 48 wherein said resilient means includes a spring extending between said cover and said means for selectively moving said pressure plate.*

*50. The invention defined in claim 49 wherein the reactive axis of said spring is oriented generally perpendicular to the axis of movement of said pressure plate when said pressure plate is in said engaged position.*

*51. The invention defined in claim 41 wherein said means for exerting a relatively small force exerts an increasing magnitude of said force as said pressure plate is moved toward said disengaged position.*

*52. The invention defined in claim 51 wherein said means for exerting a relatively small force includes resilient means reacting between said cover and said means for selectively moving said pressure plate.*

*53. The invention defined in claim 52 wherein said resilient means includes a spring extending between said cover and said means for selectively moving said pressure plate.*

*54. The invention defined in claim 53 wherein the reactive axis of said spring is oriented generally perpendicular to the axis of movement of said pressure plate when said pressure plate is in said engaged position.*

*55. A cover for a clutch assembly having a release sleeve movable between first and second positions, the cover comprising:*

*a main body portion which is generally annular in shape;*

*an engagement spring seat provided on said main body portion and adapted to receive a spring thereon for urging the release sleeve toward the first position; and*

*an assister spring seat provided on said main body and adapted to receive a spring thereon for urging the release sleeve toward the second position.*

*56. The invention defined in claim 55 wherein said assister spring seat includes a button having a base portion and a projection, said projection adapted to pilot one end of the assister spring thereon.*

*57. The invention defined in claim 56 wherein said base of said button has a ramp formed thereon.*

*58. The invention defined in claim 56 further including a bracket having a first end secured to said main body portion and having a second end carrying said assister spring seat.*

*59. A release sleeve for a clutch assembly having a cover, the release sleeve being movable between first and second positions, comprising:*

*an end portion which is generally annular in shape;*

*an engagement spring seat provided on said end portion and adapted to receive a spring thereon for urging the release sleeve toward the first position; and*

*an assister spring seat provided on said end portion and adapted to receive a spring thereon for urging the release sleeve toward the second position.*

*60. The invention defined in claim 59 wherein said assister spring seat includes a button having a base portion and a projection, said projection adapted to pilot one end of the assister spring thereon.*

*61. The invention defined in claim 60 wherein said base of said button has a ramp formed thereon.*

* * * * *